United States Patent
Hinterberger et al.

(10) Patent No.: US 11,303,139 B2
(45) Date of Patent: Apr. 12, 2022

(54) PROTECTIVE DEVICE AND METHOD FOR SHUTTING DOWN AT LEAST ONE BATTERY CELL IN A BATTERY SYSTEM IN CASE OF AN ELECTRICAL SHORT CIRCUIT, AND ALSO MOTOR VEHICLE, BATTERY SYSTEM, AND BATTERY CELL HAVING THE PROTECTIVE DEVICE

(71) Applicant: AUDI AG, Ingolstadt (DE)

(72) Inventors: Michael Hinterberger, Großmehring (DE); Berthold Hellenthal, Schwanstetten (DE); Peter Pilgram, Neuburg an der Donau (DE)

(73) Assignee: AUDI AG, Ingolstadt (DE)

( * ) Notice: Subject to any disclaimer, the term of this patent is extended or adjusted under 35 U.S.C. 154(b) by 148 days.

(21) Appl. No.: 16/782,748

(22) Filed: Feb. 5, 2020

(65) Prior Publication Data
US 2020/0266637 A1 Aug. 20, 2020

(30) Foreign Application Priority Data
Feb. 19, 2019 (DE) .......................... 102019202163.8

(51) Int. Cl.
*H02J 7/00* (2006.01)
*H01M 10/42* (2006.01)
*H01M 10/48* (2006.01)

(52) U.S. Cl.
CPC ......... *H02J 7/0029* (2013.01); *H01M 10/425* (2013.01); *H01M 10/48* (2013.01); *H02J 7/0047* (2013.01); *H01M 2010/4271* (2013.01)

(58) Field of Classification Search
USPC ....................................................... 320/134
See application file for complete search history.

(56) References Cited

U.S. PATENT DOCUMENTS

2007/0108944 A1* 5/2007 Pellenc ................. H02J 7/0042
320/130
2013/0200841 A1* 8/2013 Farkas .................. H02J 7/0042
320/107
(Continued)

FOREIGN PATENT DOCUMENTS

DE 102011121604 A1 6/2013
DE 102013220760 A1 4/2015
(Continued)

OTHER PUBLICATIONS

German Search Report dated Oct. 11, 2019 in corresponding German Application No. 10 2019 202 163.8; 28 pages.

*Primary Examiner* — Bryce M Aisaka
(74) *Attorney, Agent, or Firm* — Maier & Maier, PLLC (57) ABSTRACT

A protective device for shutting down at least one battery cell in a battery system of a motor vehicle in case of an electrical short circuit. The protective device is configured to conduct an electric current, which flows through the at least one battery cell, through a measurement element, in which the current generates an electrical measurement voltage in dependence on its amperage and/or its amperage gradient. The measurement element is coupled to an analog monitoring circuit, in which a comparison unit is configured to trigger a triggering signal for the case that the amperage rises at least by a predetermined delta value within a predetermined duration, and a switching unit is configured to receive the triggering signal and to interrupt the current upon receiving the triggering signal by switching at least one switching element.

8 Claims, 5 Drawing Sheets

(56) References Cited

U.S. PATENT DOCUMENTS

2015/0048799 A1    2/2015  Wey
2017/0038423 A1*  2/2017  Ragaini .................. H01F 38/40

FOREIGN PATENT DOCUMENTS

| | | |
|---|---|---|
| DE | 102014202622 A1 | 8/2015 |
| DE | 102014209463 A1 | 11/2015 |
| DE | 102017203211 A1 | 8/2018 |
| EP | 2194600 A1 | 6/2010 |

* cited by examiner

PROTECTIVE DEVICE AND METHOD FOR SHUTTING DOWN AT LEAST ONE BATTERY CELL IN A BATTERY SYSTEM IN CASE OF AN ELECTRICAL SHORT CIRCUIT, AND ALSO MOTOR VEHICLE, BATTERY SYSTEM, AND BATTERY CELL HAVING THE PROTECTIVE DEVICE

FIELD

The invention relates to a protective device for shutting down at least one battery cell in a battery system for the case in which an electrical short circuit is detected. The protective device can be used for a battery system of a motor vehicle or a stationary accumulator. The invention also includes a battery cell and a battery system which are each configured to interrupt a short circuit by means of the protective device. The invention also comprises a motor vehicle having the battery system according to the invention. Finally, a method for shutting down an emerging short circuit current in at least one battery cell is provided.

BACKGROUND

In a motor vehicle, there is interest in protecting the battery system from damage in case of a short circuit in its electrical network, because a short circuit current can permanently damage the battery cells of the battery system. Therefore, if a short circuit occurs, it has to be detected and the short circuit current has to be interrupted. The faster this can be carried out, the less are damages in the battery cells, for example, heat damage or damage to the electrochemical cells.

For this purpose, it is known from EP 2 194 600 B1 that a switching element for interrupting a current of a battery can be integrated into such a battery.

It is known from DE 10 2011 121 604 A1 that a short circuit can already be detected before the short circuit reaches its full short circuit amperage by a gradient of the amperage being checked for an impermissibly large current increase and then a circuit breaker being opened.

A short circuit detection device based on the current gradient is also described in DE 10 2013 220 760 A1, which can moreover be integrated into a battery cell. The amperage of a current of the battery cell can be detected by means of a shunt resistor. A current gradient can be measured directly by means of a coil.

The monitoring of an onboard electrical system of a motor vehicle is known from DE 10 2017 203 211 A1, which also monitors the gradient of the amperage.

A so-called smart battery is known from U.S. Pat. No. 2,015,048 799 A1, in which charging and discharging procedures can be carried out in dependence on the present operating state.

The known monitoring methods presume that a controller of the switching element for interrupting a short circuit can be controlled by a microcontroller which can already recognize the increase of the amperage in case of a short circuit before the full short circuit amperage is reached. However, this requires the digitization of the measurement signals to be carried out at a correspondingly high sampling frequency. Such a protective device becomes very complex to implement in this way, however.

SUMMARY

The invention is based on the object of interrupting a current in at least one battery cell in case of a short circuit.

A protective device for shutting down at least one battery cell in a battery system is provided by the invention. The battery system can be operated in this case in a motor vehicle or in a stationary accumulator. The shutting down takes place in case of an electrical short circuit. The protective device is configured to conduct an electric current which flows through the at least one battery cell to be protected through a measurement element, in which the current generates an electrical measurement voltage in dependence on its amperage and/or in dependence on its amperage gradient (change of the amperage with the time). Such a measurement element can comprise, for example, a shunt resistor (for the amperage dependence) and/or an electrical inductor (electrical coil for the gradient dependence). The shutdown of the battery cell takes place by said electric current being interrupted or shut down by switching at least one switching element.

To keep the technical expenditure low for the recognition of the short circuit, the invention provides that the measurement element is coupled to an analog monitoring circuit, in which a comparison unit is configured to generate or at least trigger a triggering signal for the case in which the amperage increases at least by a predetermined delta value within a predetermined duration. In other words, the recognition of a short circuit takes place in such a manner that the monitoring of the amperage and/or the amperage gradient of the electric current to be monitored is performed by means of an analog monitoring circuit. It is thus not dependent on sampling by means of an analog-to-digital converter and is thus not subject to the restriction to the Nyquist frequency, as is the case with digital monitoring by means of a microcontroller. As soon as the analog monitoring circuit generates a triggering signal, the current can be interrupted. For this purpose, a switching unit of the protective device is configured to receive the triggering signal and to interrupt the current upon receiving the triggering signal. The switching unit can in turn be based on an analog circuit or a digital circuit, for example, a microcontroller. The switching unit can switch a switching element, through which the electric current flows, into an electrically blocking state. The analog monitoring circuit does not first wait in this case until the amperage exceeds a predetermined limiting value, thus until the short circuit has fully formed (reaching the short circuit amperage). Rather, a short circuit is already recognized or a short circuit is detected if the amperage rises at least by a predetermined delta value within a predetermined duration, thus if a change of the amperage within the duration by more than the delta value results. Therefore, the short circuit may already be recognized as a short circuit upon the emergence thereof, while the amperage is still rising, and the switching unit can interrupt the current.

The invention has the advantage that one is not dependent on a rapid analog-to-digital converter to analyze the gradient of the amperage of the monitored electric current. The generation of the triggering signal can be carried out by means of the analog monitoring circuit solely on an analog basis, so that limiting to the Nyquist frequency does not result.

The invention also comprises embodiments which result in additional advantages.

In one embodiment, the measurement element generates the measurement voltage in dependence on the amperage, i.e., in particular not in dependence on the amperage gradient. In other words, the measurement element is based on a resistive resistance value of the measurement element, which can comprise a shunt resistor for this purpose, for example. In other words, the measurement voltage is proportional to the amperage value. The comparison unit comprises a capacitor and/or an inductance and is configured to limit the recharging of the capacitor using a predetermined time constant in operation of the protective device. The capacitor is coupled to the measurement element. If the measurement voltage changes because of a change of the amperage, this thus has an effect on the voltage at the capacitor. If the change of the amperage occurs sufficiently rapidly, the comparison unit can thus only recharge the capacitor using a limited time constant, so that a rapid change of the amperage thus cannot be compensated for rapidly enough (only limited using the time constant), whereby a comparison of the rise of the amperage to the time constant implicitly results. If the rise of the amperage occurs at a lower gradient than that which corresponds to the time constant, in contrast, a faster recharging procedure thus results at the capacitor because of the comparison unit itself, so that the change of the amperage accordingly has little effect on the charge state of the capacitor. Whether the capacitor is thus actually recharged is thus dependent on how rapidly the measurement voltage, i.e., with which gradient or with which value per unit of time, the amperage rises or falls.

In one embodiment, the comparison unit comprises a high-pass filter circuit, which is configured to generate the triggering signal in dependence on a signal curve of the measurement voltage. In other words, the signal curve of the measurement voltage is filtered or analyzed by the high-pass filter as to whether a frequency component above a limiting frequency of the high-pass filter circuit is present. Such a frequency component above a limiting frequency only results in the case of a rising flank or falling flank of the signal curve having a predetermined absolute-value minimum slope. If the amperage thus rises more slowly, the frequency component above the limiting frequency thus does not result. In contrast, if the amperage changes with a gradient which is above a threshold value that corresponds to the limiting frequency, a frequency component above the limiting frequency thus results, which is recognized by the high-pass filter circuit in such a way that the triggering signal is generated or triggered. The advantage of an analog high-pass filter circuit is that by defining the limiting frequency, it is possible to differentiate between a beginning of a short circuit current, on the one hand, and a controlled current rise as a result of an acceleration phase of the motor vehicle, for example, on the other hand. It is particularly preferable to provide the comparison unit on the basis of a differentiator. A circuit of a differentiator can be formed in a known manner on the basis of an operational amplifier. A differentiator is a special form of a high-pass filter circuit which particularly robustly detects a current rise in the case of a short circuit.

In one preferred embodiment, the measurement element is a shunt resistor in said manner. An electrical component having a predetermined ohmic resistance value less than 5 milliohm, in particular less than 1 milliohm, through which the current is conducted, can be used as the measurement element for this purpose, for example. Additionally or alternatively thereto, a line element and/or a conductor track can be used as a shunt resistor. A shunt resistor has the advantage that it can additionally also be used for the measurement of the amperage of the current for monitoring a power output and/or power consumption of the at least one battery cell. A voltage tap for the measurement voltage can be provided at contacts of the measurement element.

In one embodiment, the comparison unit comprises an analog comparator circuit, which is configured to generate the triggering signal in dependence on an output signal of the comparison unit. By means of a comparator circuit, it is possible to differentiate between a triggering case, in which the triggering signal is to be generated, and a normal operating case, in which the triggering signal is not to be generated, by defining a comparison value or reference value, which is received by the comparator circuit and is compared, for example, to an output signal of said high-pass filter circuit and/or said circuit having the capacitor and/or the inductor. It is preferably provided that the comparison value is formed adaptively, so that, for example, for the case that said acceleration mode of the motor vehicle is provided (so-called boost mode) and/or a fast charge mode of the motor vehicle or a charging station, the comparison value can then be modified or adapted so that incorrect triggering of the triggering signal does not occur, although temporarily a current rise and/or an amperage exists which would result in generation of the triggering signal without adaptation of the comparison value.

In one embodiment, an amplifier circuit for amplifying the measurement signal and/or a filter circuit is connected downstream from the measurement element. The advantage results in this way that an influence of the measurement element on the current can be kept small, so that, for example, in the case of a shunt resistor, only a low ohmic resistance value, in particular a resistance value less than 2 milliohm, is necessary to detect a signal curve of the amperage. The amplifier circuit can be connected downstream of said comparison unit. The amplifier circuit can be based on an operational amplifier. A filter circuit can be designed to filter out a voltage peak, for example, by means of smoothing or low-pass filtering or bandpass filtering. This can avoid incorrect triggering.

The described protective device can be designed as an integral component of a single battery cell, so that the battery cell is itself protected by its protective device from a short circuit. In this context, a battery cell is also provided by the invention, which comprises an electrochemical cell for generating a cell current in a known manner. The battery cell preferably comprises a single electrochemical cell. Such a cell can be implemented, for example, as a so-called cell coil. At least one switching element is integrated in the battery cell, which is designed for switching the cell current. The switching element can be, for example, a transistor or an arrangement made of multiple transistors. In the battery cell according to the invention, a protective device according to the invention is integrated into the battery cell. If a short circuit is generated between cell poles of the battery cell, the battery cell thus protects itself by means of its protective device by shutting down or interrupting its cell current by means of the switching element.

The protective device can also be integrated into a battery system and can be arranged cell-externally in this case, however, to protect multiple battery cells. In this context, the invention also provides a battery system having multiple battery cells, wherein the battery system comprises an embodiment of the protective device according to the invention. Alternatively thereto, the battery system can also be formed from multiple battery cells according to the invention, i.e., each battery cell of the battery system protects itself by means of a separate integrated protective device.

The invention also includes a motor vehicle having at least one embodiment of the battery system according to the invention, in which a protective device for multiple battery cells is integrated or each battery cell has its own protective device integrated. The motor vehicle according to the invention is preferably designed as an automobile, in particular as a passenger automobile or truck, or as a minivan or as a motorcycle. As already stated, the invention can also be implemented in a stationary accumulator, however, which can be operated together with a charging column, for example, to buffer energy for it.

The operation of the protective device according to the invention results in a method which is also part of the invention. The method shuts down at least one battery cell in a battery system in case of an electrical short circuit. For this purpose, said protective device is used to conduct an electric current, which also flows through the at least one battery cell, through a measurement system or measurement element, in which the current generates an electrical measurement voltage in dependence on an amperage and/or in amperage gradient of the current. The actual voltage generated by the battery cell is thus not measured, but rather the amperage or a gradient of the amperage, by the corresponding measurement element, for example, a shunt resistor and/or an electrical inductor, being provided, through which the current is conducted.

The measurement element is coupled to an analog monitoring circuit in the described manner, in which a comparison unit generates or triggers a triggering signal for the case in which the amperage rises at least by a predetermined delta value within a predetermined duration, i.e., the amperage changes within the predetermined duration by a predetermined amperage value. The duration can be in a range from 0.1 ms to 10 ms. The delta value can be in a range from 10 A to 500 A.

A switching unit interrupts the current in dependence on the triggering signal by switching at least one switching element. If the triggering signal is thus generated, because the amperage has risen by at least the delta value within the predetermined duration, the current is thus interrupted by the switching unit. For this purpose, a switching element, through which the current flows, can be switched into an electrically blocking state in the described manner.

BRIEF DESCRIPTION OF THE DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another. The disclosure is therefore also to comprise other than the described combinations of the features of the embodiments. Furthermore, the described embodiments can also be supplemented by further ones of the already described features of the invention.

In the figures, identical reference signs each identify functionally-identical elements.

Figure 1:
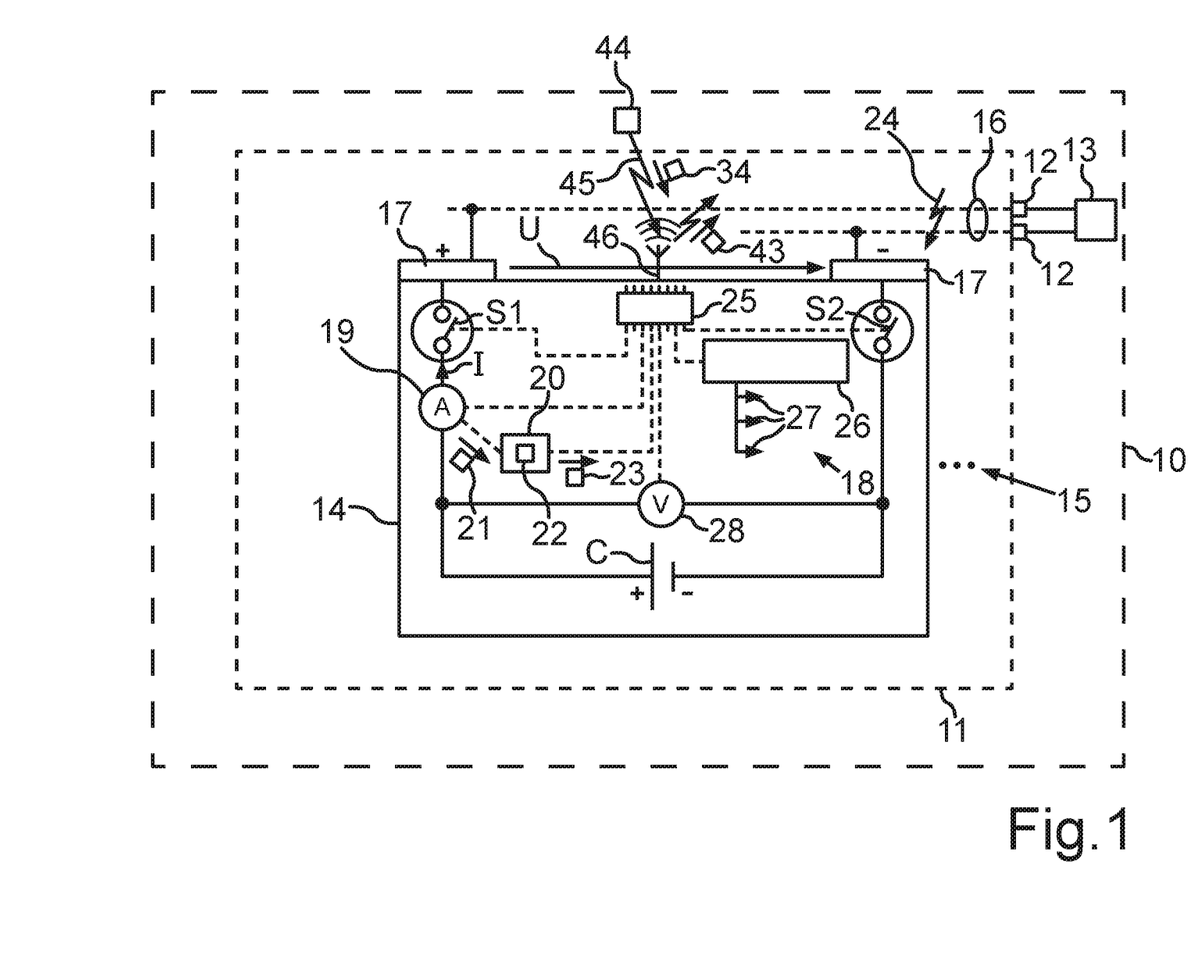
FIG. 1 shows a schematic illustration of one embodiment of the motor vehicle according to the invention.

FIG. 1 shows a motor vehicle 10, which can be an automobile, in particular a passenger automobile or truck. A battery or a battery system 11 can be provided in the motor vehicle 10 to be able to generate electric power in the motor vehicle 10. The battery system 11 can be, for example, a high-voltage battery system, by means of which a battery voltage can be provided at battery poles 12, which is greater than 60 V, in particular greater than 100 V. An onboard electrical system 13 can be connected to the battery poles 12, which can comprise, for example, a power electronics unit for operating an electrical drive motor of the motor vehicle 10.

Multiple battery cells 14 can be provided in the battery system 11 to provide the battery voltage at the battery poles 12, of which only one single battery cell 14 is shown in FIG. 1 for the sake of comprehensibility and the other battery cells are symbolically represented by ellipsis 15. The battery cells 14 can be connected to an interconnection unit 16 of the battery system 11, by which the battery cells 14 can be interconnected or connected to the battery poles 12. The interconnection unit 16 can comprise, for example, at least one busbar and/or at least one wire.

A cell voltage U can be provided by each battery cell 14, which can be in a range from 1 V to 8 V. To generate the cell voltage U, an electrochemical cell C, which can be designed, for example, as a cell coil, can be provided in the battery cell 14. Each battery cell 14 can be designed as a so-called smart cell or switchable battery cell. For this purpose, at least one switching element S1, S2 (two switching elements S1, S2 are shown by way of example) can be provided in the battery cell 14, by each of which an electric current I can be switched, so that this current I can be interrupted or blocked. The current flow of the current I from the electrochemical cell C to cell poles 17 of the battery cell 14 can be interrupted by the at least one switching element S1, S2. Furthermore, it can be provided that a protective device 18 is provided in the battery cell 14 to protect the battery cell 14 from damage in case of a short circuit if the current I can be greater than a highest permissible maximum value. For this purpose, the protective device 18 can be provided in the battery cell 14 in the illustrated manner. In another embodiment, the protective device can also be connected externally to the cell poles 17 and thus a single protective device can be active or usable for multiple battery cells 14.

The protective device 18 can comprise a measurement element 19, through which the current I of the cell C can be conducted. An analog monitoring circuit 20 can be coupled to the measurement element 19, which, in dependence on a measurement voltage 21 of the measurement element 19 by means of a comparison unit 22, can generate a triggering signal 23, which signals that a short circuit has begun and therefore at least one switching element S1, S2 is to be switched to electrically blocking. The short circuit can be present in the battery cell 14 or, as shown in FIG. 1, can be present outside the battery cell 14 as a short circuit 24, for example, in the interconnection unit 16 or in another battery cell or in the onboard electrical system 13.

A switching unit 25 can receive the triggering signal 23 and thereupon activate the at least one switching element S1, S2 to switch it to the electrically blocking state, whereby a further rise of an amperage of the current I is blocked or prevented. The switching unit 25 can be based on a microcontroller.

In addition, a further sensor unit 26 can be provided, by which further sensors 27 can be operated, for example, a temperature sensor. Furthermore, the cell voltage U can be monitored by means of a voltage measuring unit 28. The sensor unit 26 and the voltage measuring unit 28 and also suitable sensors 27 are known per se from the prior art.

Figure 2:
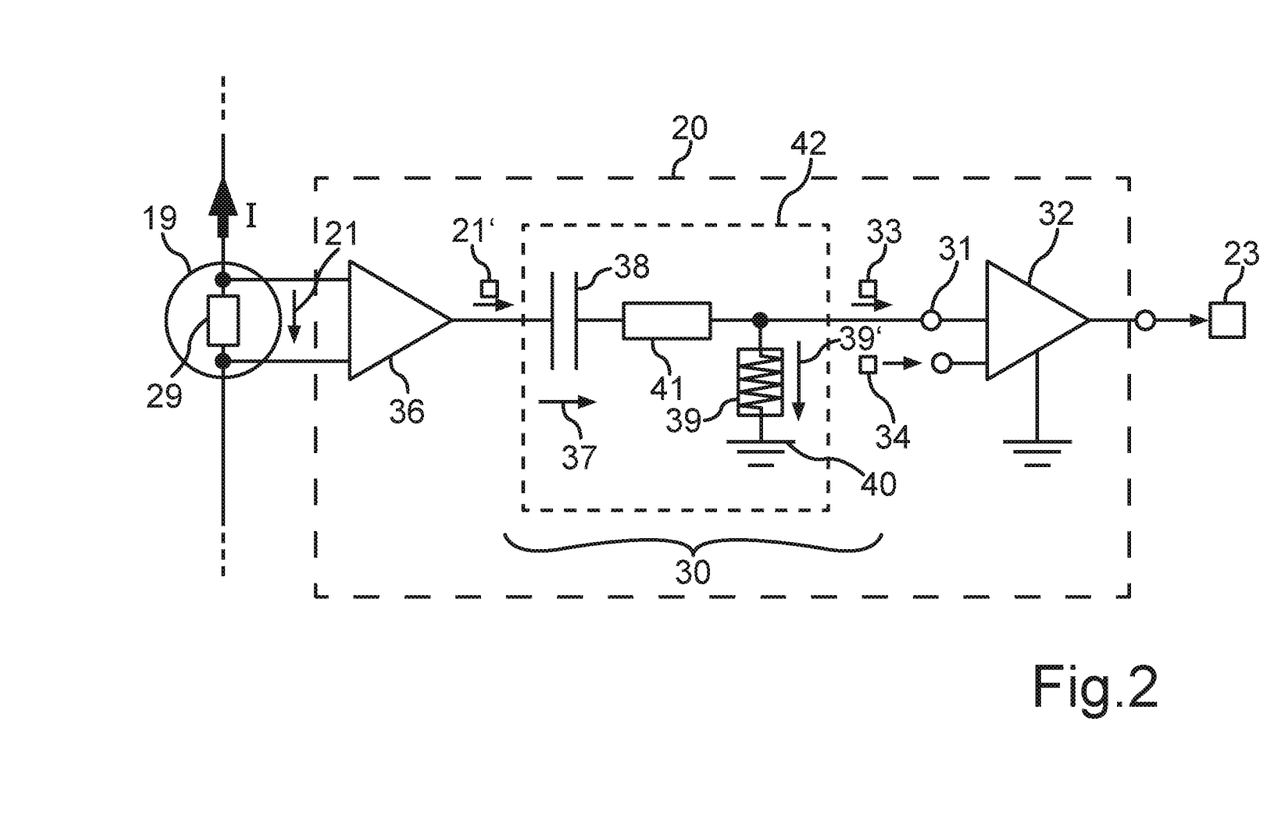
FIG. 2 shows a schematic illustration of a protective device according to the invention.

With respect to the protection from a short circuit 24, the protective device 18 can be designed in the manner illustrated in FIG. 2. The measurement element 19, through which the current I can flow from the electrochemical cells C to a cell pole 17, is illustrated once again in FIG. 2. The measurement element 19 can be implemented, for example, on the basis of a shunt resistor 29, via which the measurement voltage 21 drops in dependence on an amperage of the current I, i.e., an absolute value of the measurement voltage 21 is dependent on the amperage according to Ohm's law.

The analog monitoring circuit 20 can comprise a comparison unit 30, which is coupled to the measurement element 19. A comparator 32 can be provided at an output 31 of the comparison unit 30 to compare an output signal 33 of the comparison unit 30 to a comparison value 34, and the triggering signal 23 can be generated by the comparator 32 for the case in which the output signal 33 exceeds or falls below the comparison value 34.

A functionality of the comparison unit 30 will be explained hereafter on the basis of FIG. 2 and FIG. 3.

Figure 3:
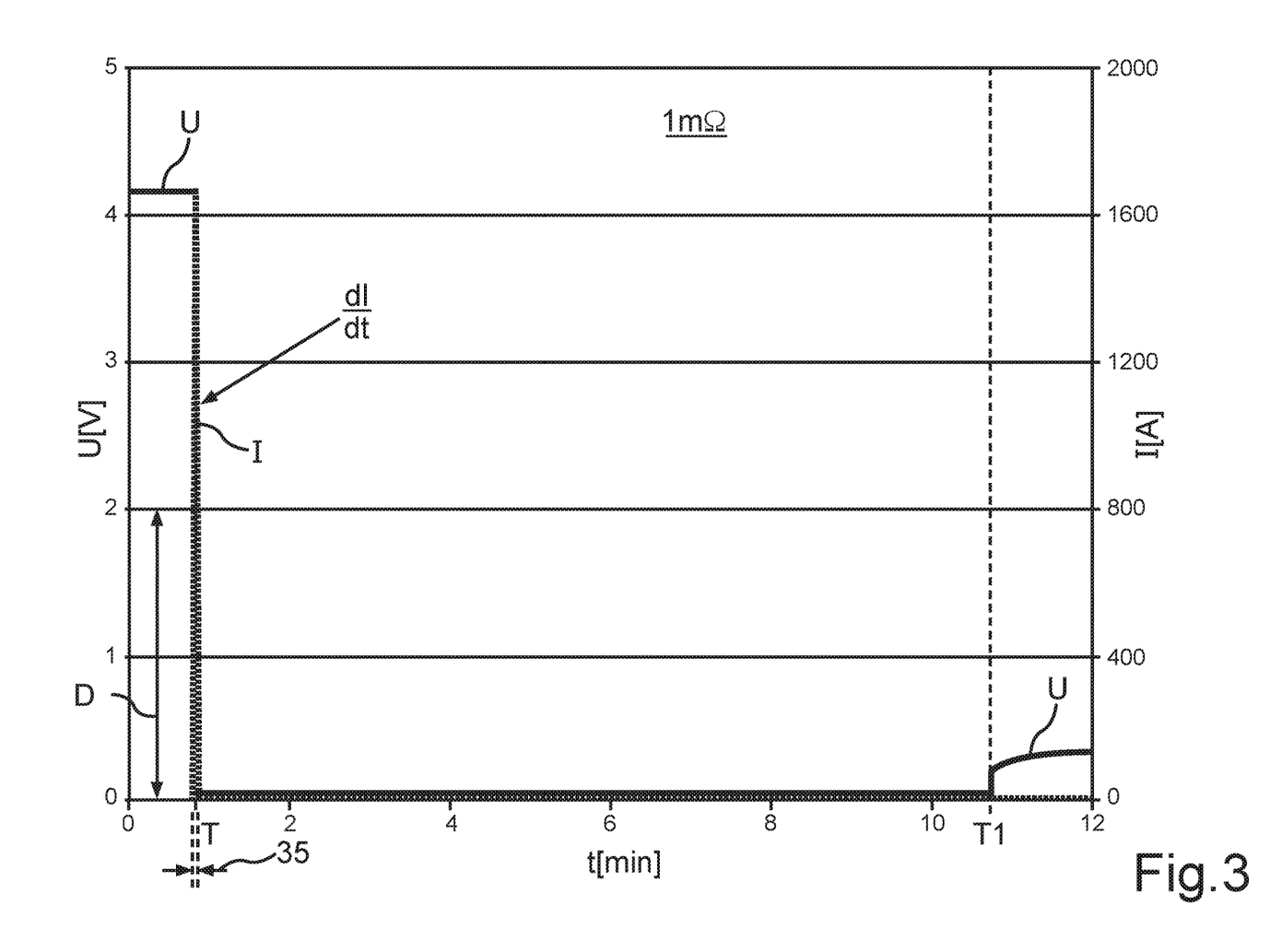
FIG. 3 shows a diagram having schematic curves of operating variables of a battery cell of a battery of the motor vehicle of FIG. 1 in a first short circuit case.

FIG. 3 shows, in a diagram over the time t, time curves of the cell voltage U and the current I, which can be a cell current of the electrochemical cell C here. For the further explanation, it is assumed that the short circuit 24 occurs at a short circuit point in time T. It can be monitored by the comparison unit 30 whether a chronological change of the amperage of the current I within a predetermined duration 35 changes by more than a predetermined delta value D. In the illustrated example, the delta value is set to the value 800 A, wherein this is only an exemplary delta value D. FIG. 3 is based on an example in which the short circuit 24 causes an electrical connection having a resistance value of 1 milliohm between the cell poles 17. The comparison unit 30 recognizes at the short circuit point in time T or from the short circuit point in time T that the amperage of the current I changes within the duration value 35 by more than the delta value D. A gradient dI/dt of the amperage of the current I thus results which is greater than a limiting value, which signals a rapid current rise because of a short circuit 24.

The output signal 33 can be generated for this comparison, for example, by means of the analog circuit shown in FIG. 2, in which the measurement element 19 is coupled to an amplifier circuit 36, which amplifies the measurement voltage 21. The amplifier circuit 36 can be provided if needed. The amplified measurement voltage 21' (or the unamplified measurement voltage 21) can set or define a capacitor voltage 37 of a capacitor 38 of the comparison unit 30. However, this does not occur arbitrarily rapidly, but rather a time constant at which a voltage of the capacitor 38 can be changed can be limited by an inductor 39 if the capacitor 38 recharges its electric charge via a ground potential 40. The time constant can be set in this way by a value of the inductor 39 and an ohmic resistor 41 and thus can be adapted to the possible load cases or time processes in the onboard electrical system 13. A provided load requirement, for example, the acceleration of the motor vehicle 10, can thus be differentiated from an emerging or beginning short circuit 24. The illustrated circuit can be implemented by a second-order high-pass filter 42 being implemented or provided as an analog circuit. The output signal 33 can be an output voltage 39' in the described design, which can drop via the inductor 39 when a recharging procedure takes place in the capacitor 38 because of a change of the amplified measurement voltage 21'.

Alternatively, the comparison unit 30 can be based on a circuit of a differentiator, for which an operational amplifier can also be provided.

To enable a sharper delimitation or more interference-free recognition of the beginning of the short circuit 24, the output signal 33 of the comparison unit 30 can be compared via the comparator 32 to the comparison value 34 to provide the triggering signal 23 as a switching signal, which is switched between two signal states. The comparison value 34 can also be adaptable or settable in this case and can be predetermined, for example, by a control unit 44, which knows of or plans an imminent or planned load procedure or switching procedure in the onboard electrical system 13. The comparison value 34 can thus, for example, be emitted or transmitted via a communication connection 45 from the control unit 44 to a communication unit 46 of the battery cell 14 or the protective device 18. The protective device 18 can then set or provide the received comparison value 34 for the comparator 32. If then, for example, an electric motor for a drive of the motor vehicle 10 is to be supplied in a boost mode with a current which is greater than the nominal current for a predetermined longest duration, or a fast charging mode is started, triggering of the protective device 18 can thus be prevented in that the comparison value 34 is adapted accordingly. It can then be reset again to the comparison value 34 previously set or provided for the normal mode.

Figure 4:
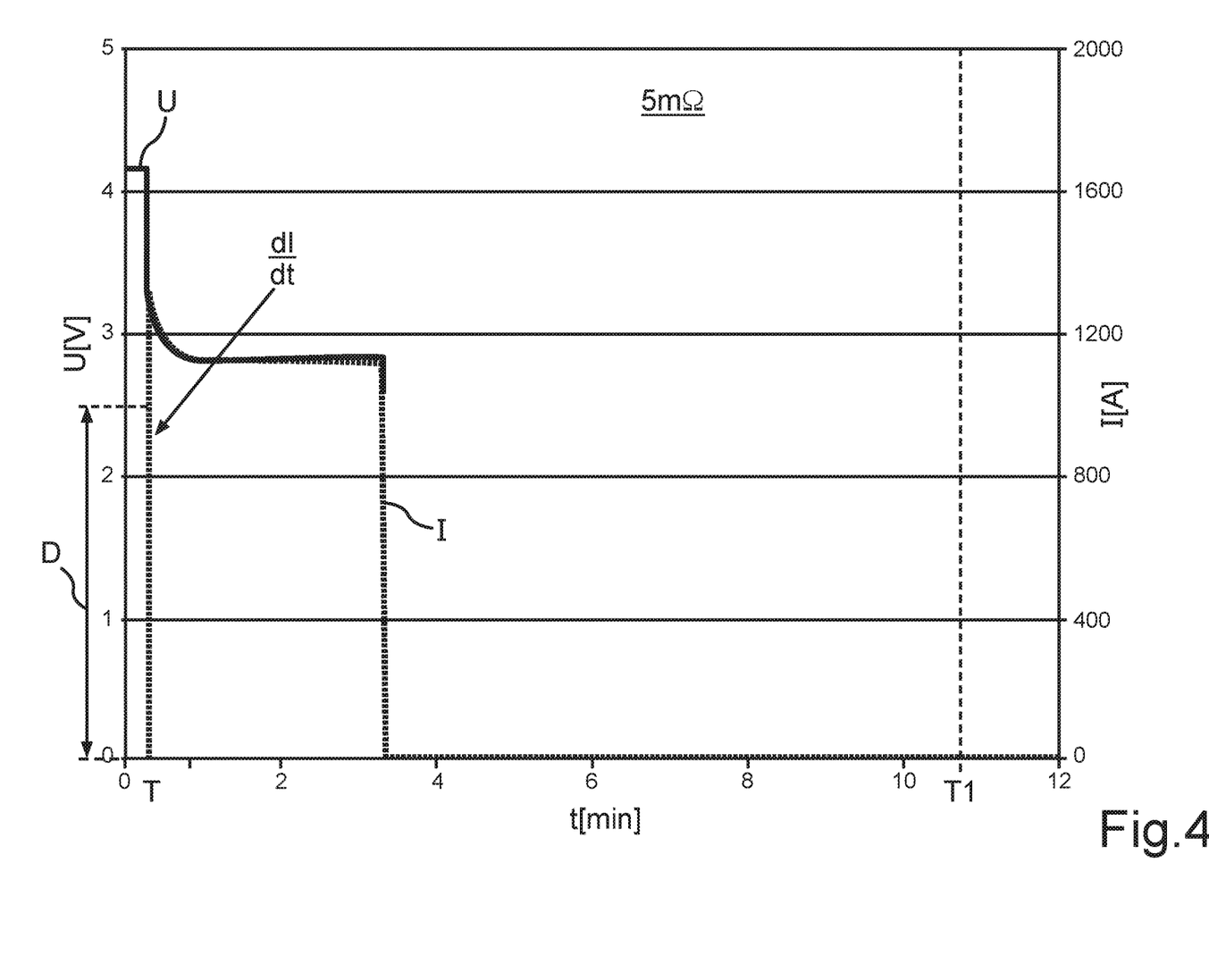
FIG. 4 shows a diagram having schematic curves of the operating variables in a second short circuit case.

FIG. 4 illustrates that the described detection or recognition of the short circuit 24 by means of the protective device 18 is also possible if the short circuit 24 causes a resistance value of 5 milliohm instead of 1 milliohm between the cell poles 17. The delta value D is adapted accordingly here.

Figure 5:
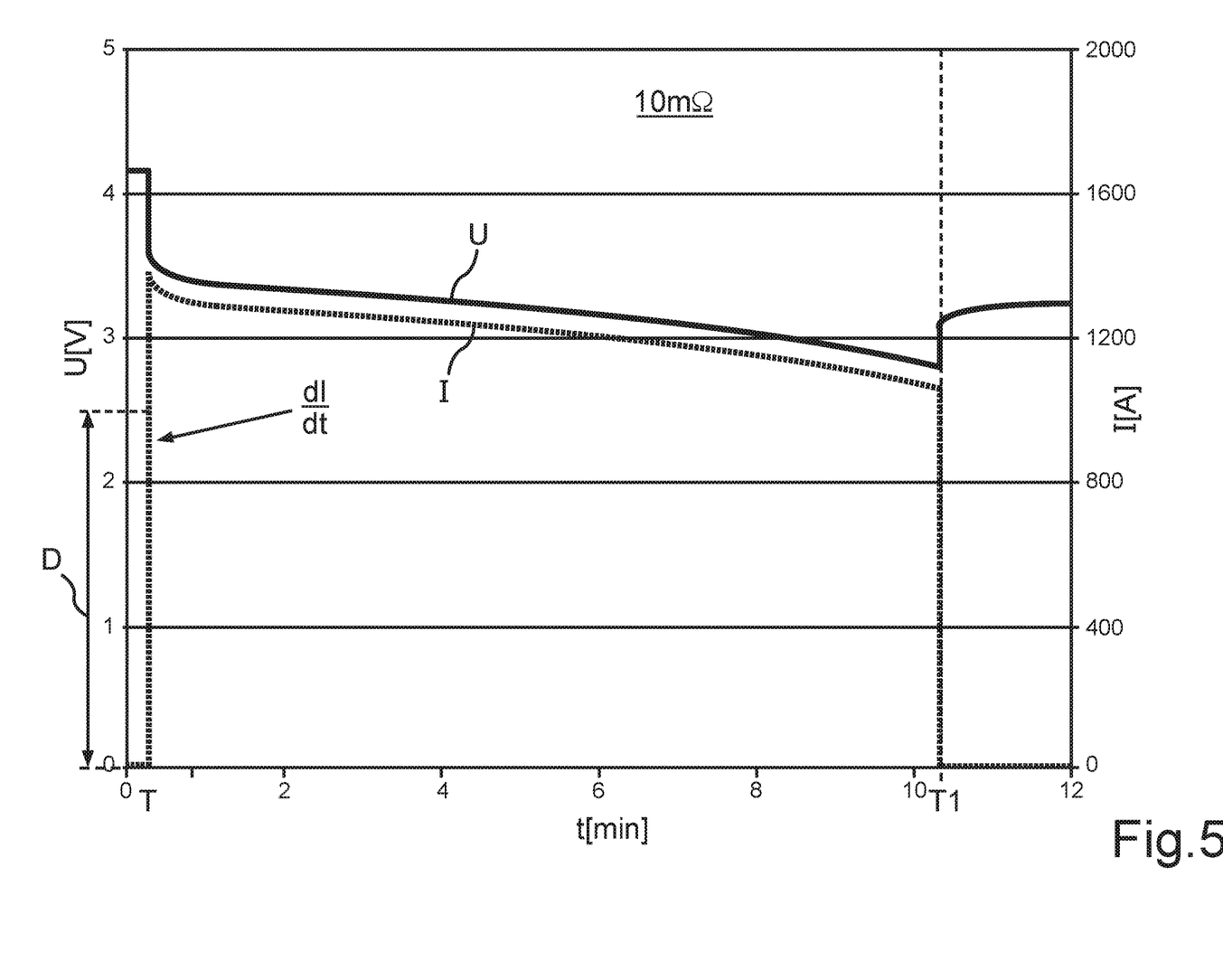
FIG. 5 shows a diagram having schematic curves of the operating variables in a third short circuit case.

FIG. 5 illustrates that a detection is also possible in the case of a short circuit 24 at 10 milliohm if the delta value D is set, for example, to a value in the range of 50 A to 300 A.

Therefore, an adaptation of the delta value D is only necessary to be able to react to different short circuit types or to be able to take into consideration short circuits 24 of different resistance values.

It is furthermore shown how the short circuit is ended at an end point in time T1 and in this way the cell voltage U builds up again. It is to be noted that the end point in time T1 does not correspond to the shutdown point in time as can be effectuated by the protective device. The shutdown procedure of the protective device 18 is not shown in FIG. 3 to FIG. 5. It would occur at the short circuit point in time T or immediately thereafter (i.e., in less than 1 second after the short circuit point in time T). Rather, a conventional curve without short circuit recognition and without short circuit shutdown is shown to illustrate the effects of the short circuit. In other words, what happens when one does nothing is illustrated.

By means of a current gradient measurement dI/dt, the short circuit 24 or a comparably strong change in the current flow can thus be recognized. A current measuring unit in the form of the measurement element 19 (for example, a shunt resistor 29) and a chronological current gradient determination are required for this purpose, which can be implemented in the analog monitoring circuit 20 by means of the comparison unit 30. The protective device 18 can thus, at the beginning or upon the emergence of a short circuit 24, switch one switching element S1, S2 or multiple switching elements S1, S2 to electrically blocking or keep them electrically blocking (in the case of already open or electrically blocking switching element) within a duration which can be in a range from 10 µs to 10 ms, so that a current flow does not occur as would occur if the short circuit 24 were maintained and if the electrochemical cell C were still switched on. Damage to the battery cell 14 is thus avoided.

The communication connection 45 can be based, for example on the foundation of a wired communication or a radio communication. A communication bus and/or an optical fiber communication network can be provided in the battery system 11, for example. A radio connection can be implemented, for example, on the foundation of Bluetooth technology and/or WLAN technology (WLAN—Wireless Local Area Network).

If a short circuit is recognized, when the triggering signal 23 is generated, a notification signal 43 can also be emitted to at least one further battery cell 14 via the communication unit 46, for example, to at least one adjacent cell and/or the control unit 44, so that in this way an additional protective measure can also be controlled or initiated.

Very rapid short circuit detection thus results and therefore a current shutdown while a short circuit current is still building up. This is an auxiliary function which is simple to implement in a battery cell 14. A robust or reliable differentiation between a short circuit 24 and an intended current flow during an acceleration of the motor vehicle 10 and/or during a boost mode is also possible. An increase in the reliability of the operation of the battery cell 14 results in this way. Since the buildup of a short circuit current is prevented, undesired intense battery cell loads are thus avoided. The triggering threshold for generating the triggering signal can be changeable or adaptable via at least one settable threshold value and/or parameter value, as is described in conjunction with the comparison value 34. However, it can also be provided that at least one other threshold value and/or parameter value is formed variably and is adapted in dependence on a planned or imminent load case of the onboard electrical system 13 to avoid incorrect triggering of the protective device. For example, the delta value D and/or the duration value 35 can be provided as a respective settable or configurable parameter value of the protective device 18.

Overall, the examples show how a short circuit detection by means of current gradient measurement can be provided in switchable battery cells (smart cells) by the invention.

The invention claimed is:

1. A protective device for shutting down at least one battery cell in a battery system in case of an electrical short circuit, comprising:
    a measurement element through which the protective device is configured to conduct an electric current flowing through the at least one battery cell, such that the electric current generates in the measurement element an electrical measurement voltage based on an amperage of the electric current,
    an analog monitoring circuit coupled to the measurement element, the analog monitoring circuit comprising a comparison unit which is configured to trigger a triggering signal when the amperage rises at least by a predetermined delta value within a predetermined duration, and
    a switching unit which is configured to receive the triggering signal and, upon receiving the triggering signal, to interrupt the electric current by switching at least one switching element,
    wherein the comparison unit comprises a capacitor and/or an inductance and is configured to limit recharging of the capacitor using a predetermined time constant in operation of the protective device, and
    wherein the capacitor is coupled to the measurement element.

2. The protective device according to claim 1, wherein the comparison unit comprises a high-pass filter circuit.

3. The protective device according to claim 1, wherein the measurement element comprises a shunt resistor.

4. The protective device according to claim 1, wherein the analog monitoring circuit comprises an analog comparator circuit, which is configured to generate the triggering signal in dependence on an output signal of the comparison unit.

5. The protective device according to claim 1, wherein an amplifier circuit for amplifying the measurement voltage and/or a filter circuit is connected downstream of the measurement element.

6. A battery cell, comprising:
    an electrochemical cell for generating a cell current and having at least one integrated switching element for switching the cell current,
    a protective device integrated into the battery cell, the protective device configured to shut down at least one battery cell in a battery system in case of an electrical short circuit,
    a measurement element, through which the protective device is configured to conduct the cell current, such that the cell current generates in the measurement element an electrical measurement voltage based on an amperage of the cell current,
    an analog monitoring circuit coupled to the measurement element, the analog monitoring circuit comprising a comparison unit configured to trigger a triggering signal when the amperage rises at least by a predetermined delta value within a predetermined duration, and
    a switching unit which is configured to receive the triggering signal and, upon receiving the triggering signal, to interrupt the cell current by switching the at least one integrated switching element,
    wherein the comparison unit comprises a capacitor and/or an inductance and is configured to limit recharging of the capacitor using a predetermined time constant in operation of the protective device, and
    wherein the capacitor is coupled to the measurement element.

7. The battery cell according to claim 6, further comprising at least one second battery cell.

8. A method for shutting down at least one battery cell in a battery system in case of an electrical short circuit, comprising:
    provision of a protective device that conducts an electric current, which flows through the at least one battery cell, through a measurement element, whereby the electric current generates an electric measurement voltage in the measurement element based on an amperage of the electric current,
    wherein the measurement element is coupled to an analog monitoring circuit, the analog monitoring circuit comprising a comparison unit which triggers a triggering signal when the amperage rises by at least a predetermined delta value within a predetermined duration,
    wherein a switching unit interrupts the electric current by switching at least one switching element upon receipt of the triggering signal,
    wherein the comparison unit comprises a capacitor and/or an inductance and is configured to limit recharging of the capacitor using a predetermined time constant in operation of the protective device, and wherein the capacitor is coupled to the measurement element.

* * * * *